US012645791B2

(12) United States Patent
Nguyen et al.

(10) Patent No.: US 12,645,791 B2
(45) Date of Patent: Jun. 2, 2026

(54) AUTOMATED APPLICATION SECURITY ONBOARDING

(71) Applicant: DISNEY ENTERPRISES, INC., Burbank, CA (US)

(72) Inventors: Truong Tuan Nguyen, Renton, WA (US); Christian Matthew Gustafson, Seattle, WA (US); Daniel Micah Babb, Mukilteo, WA (US); Kenneth William De Hoop, Huntsville, AL (US); Danielle Kish, San Jose, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 23 days.

(21) Appl. No.: 18/909,866

(22) Filed: Oct. 8, 2024

(65) Prior Publication Data

US 2026/0099594 A1 Apr. 9, 2026

(51) Int. Cl.
*G06F 21/55* (2013.01)

(52) U.S. Cl.
CPC ...... *G06F 21/554* (2013.01); *G06F 2221/033* (2013.01)

(58) Field of Classification Search
CPC .................... G06F 21/554; G06F 2221/033
USPC ........................................................ 726/23
See application file for complete search history.

(56) References Cited

U.S. PATENT DOCUMENTS

| | | | | |
|---|---|---|---|---|
| 7,302,706 B1 * | 11/2007 | Hicks | .................... | H04L 63/145 726/24 |
| 2006/0059061 A1 * | 3/2006 | Oey | ........................ | G06Q 10/10 705/35 |
| 2009/0199160 A1 * | 8/2009 | Vaitheeswaran | .... | G06F 11/3688 717/124 |
| 2011/0305147 A1 * | 12/2011 | Xu | .......................... | H04L 47/12 370/252 |
| 2014/0109063 A1 * | 4/2014 | Schissel | .............. | G06F 11/3688 717/127 |
| 2015/0185760 A1 * | 7/2015 | Schroeder | ............. | G06F 1/1671 361/679.58 |
| 2016/0217288 A1 * | 7/2016 | Serrano | ................. | G06F 21/577 |
| 2019/0114435 A1 * | 4/2019 | Bhalla | ..................... | G06F 21/55 |
| 2020/0285757 A1 * | 9/2020 | Bhalla | ..................... | G06F 21/55 |
| 2023/0067084 A1 * | 3/2023 | Mohanty | ............. | G06F 11/3476 |

(Continued)

*Primary Examiner* — David P Zarka
(74) *Attorney, Agent, or Firm* — Squire Patton Boggs LLP; Sarah Mirza

(57) ABSTRACT

The present invention sets forth a technique for performing automated application security onboarding. The technique includes receiving, via an interactive dashboard, a designation associated with a software application and one or more items of application information associated with the software application. The technique also includes determining, in real-time and based on one or more schemas, that that the one or more items of application information are sufficient for executing one or more of a plurality of software scanning tools. The technique further includes transmitting the designation and the one or more items of application information to the plurality of software scanning tools, analyzing the software application via the plurality of software scanning tools, receiving, from the plurality of software scanning tools, one or more scan results based on the analysis, and displaying the one or more scan results via the interactive dashboard.

20 Claims, 3 Drawing Sheets

(56) References Cited

U.S. PATENT DOCUMENTS

| | | | |
|---|---|---|---|
| 2023/0177164 A1* | 6/2023 | Tamboli | G06F 11/362 |
| | | | 726/26 |
| 2023/0262079 A1* | 8/2023 | Feldbau | H04L 63/101 |
| | | | 726/4 |
| 2024/0396928 A1* | 11/2024 | Sánchez | H04L 63/0236 |
| 2024/0419793 A1* | 12/2024 | Stussi | G06F 21/563 |

* cited by examiner

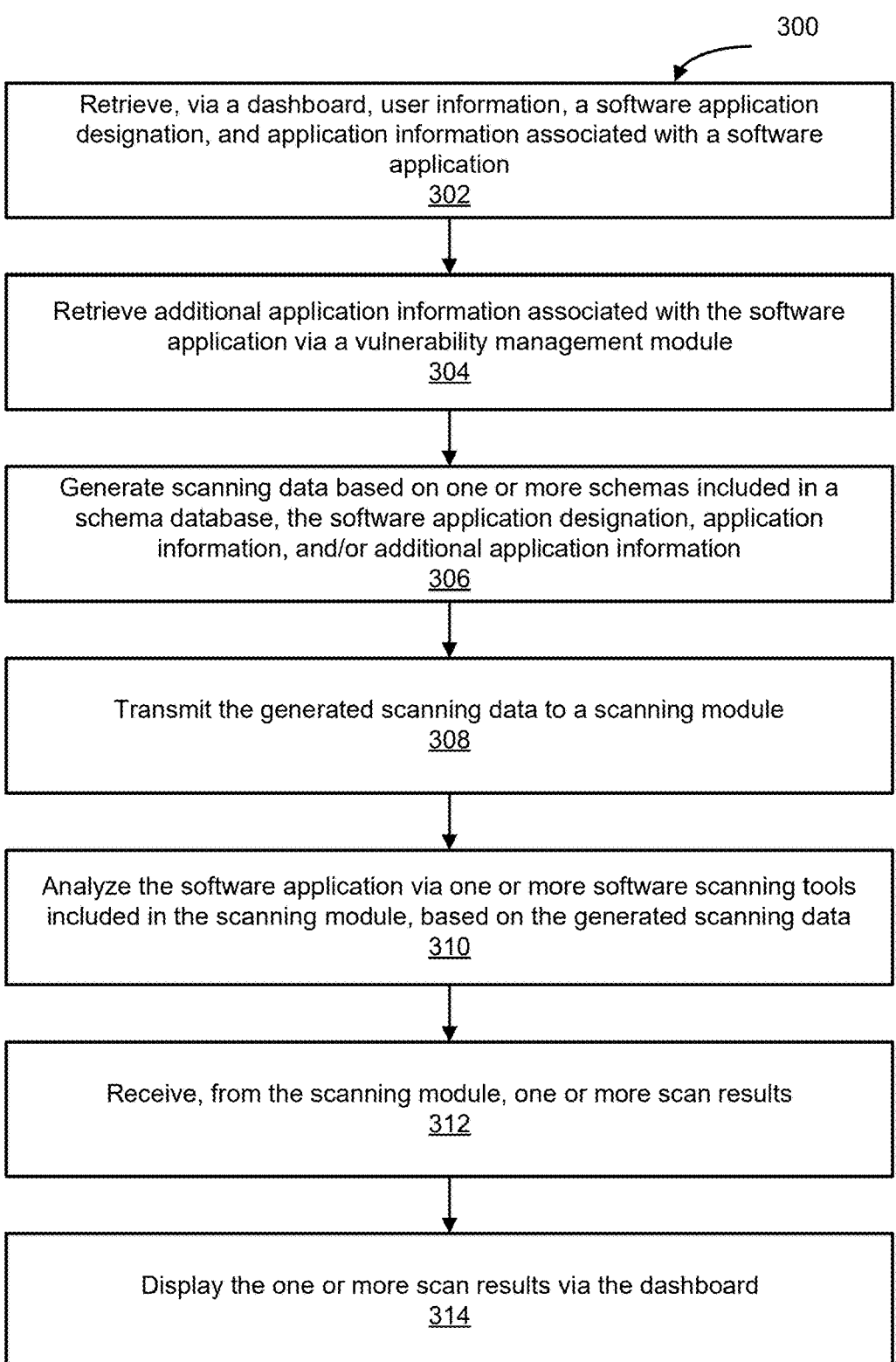

300

Retrieve, via a dashboard, user information, a software application designation, and application information associated with a software application
302

Retrieve additional application information associated with the software application via a vulnerability management module
304

Generate scanning data based on one or more schemas included in a schema database, the software application designation, application information, and/or additional application information
306

Transmit the generated scanning data to a scanning module
308

Analyze the software application via one or more software scanning tools included in the scanning module, based on the generated scanning data
310

Receive, from the scanning module, one or more scan results
312

Display the one or more scan results via the dashboard
314

FIG. 3

AUTOMATED APPLICATION SECURITY ONBOARDING

BACKGROUND

Field of the Various Embodiments

Embodiments of the present disclosure relate generally to computer security and, more specifically, to techniques for performing automated application security onboarding in enterprise environments.

Description of the Related Art

Application security onboarding is a critical task for many organizations, and is necessary to assess application-level security vulnerabilities in locally developed or third-party software applications. Security vulnerabilities may include instances of cross-site scripting, SQL injection, or embedded secrets, such as personally identifiable information (PII), passwords, or authentication tokens. Application security onboarding may include scanning an application via one or more security tools, such as Static Application Security Testing (SAST) tools, Dynamic Application Security Testing (DAST) tools, Software Component Analysis (SCA) tools, or penetration testing.

Existing techniques for performing application security onboarding are typically limited to manually scanning applications individually via multiple disparate security tools. Consequently, these techniques do not scale to very large collections of applications and are not computationally performant to scan a large number of applications in an acceptable period of time. For example, manually scanning thousands of applications via existing techniques may require several years to complete.

Furthermore, existing application security onboarding techniques may require the generation and repeated manual entry of customized input data associated with each of multiple software scanning tools, such as an identifier or description associated with an application, a uniform resource locator (URL) describing the location of the application, or a repository or branch location of the application within a software configuration management (SCM) system. The repeated manual entry of application data into multiple different software scanning tools is slow, inefficient, and error-prone. Further, manual entry of application data requires that users be familiar with the input data requirements for each of multiple software scanning tools and complicates the adoption of new or different software scanning tools.

As the foregoing illustrates, what is needed in the art are more effective techniques for automated application security onboarding.

SUMMARY

One embodiment of the present invention sets forth a technique for automated application security onboarding. The technique includes receiving, via an interactive dashboard, a designation associated with a software application and one or more items of application information associated with the software application. The technique also includes determining, in real-time and based on one or more schemas, that that the one or more items of application information are sufficient for executing one or more of a plurality of software scanning tools and transmitting the designation and the one or more items of application information to the plurality of software scanning tools. The technique further includes analyzing the software application via the plurality of software scanning tools, receiving, from the plurality of software scanning tools, one or more scan results based on the analysis, and displaying the one or more scan results via the interactive dashboard.

One technical advantage of the disclosed techniques relative to the prior art is that the disclosed techniques allow for efficient large-scale automated application security onboarding. The disclosed techniques may automatically process a software application via the simultaneous or sequential execution of multiple software scanning tools. Further, the disclosed techniques automatically generate real-time software scanning tool input data based on input schemas associated with the multiple software scanning tools. The techniques further allow the re-use of software application data without the need to manually re-enter the input data for each software scanning tool, improving both efficiency and accuracy relative to the prior art. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 3 is a flow diagram of method steps for performing automated application security onboarding, according to some embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

Figure 1:
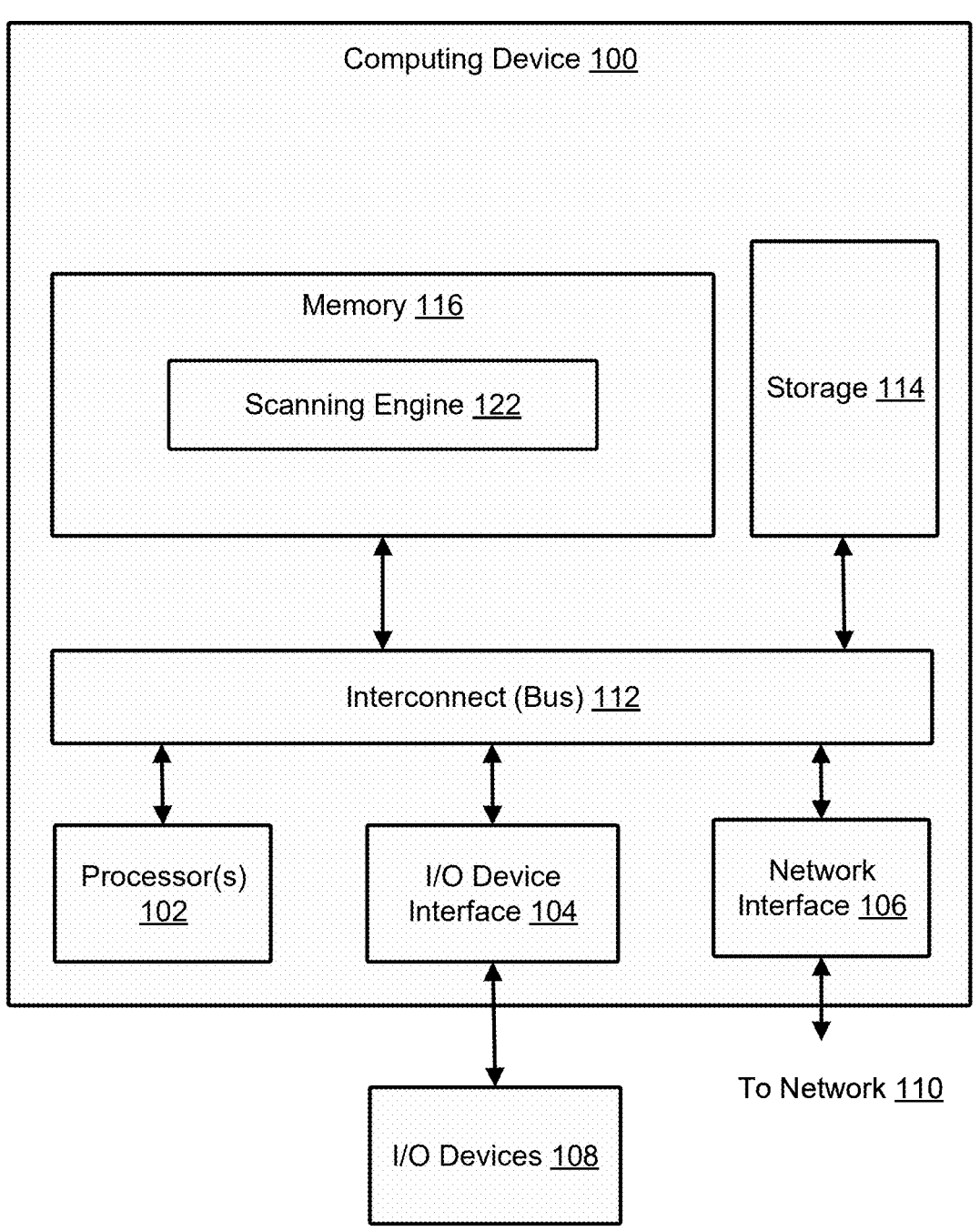
FIG. 1 illustrates a computer system configured to implement one or more aspects of various embodiments.

FIG. 1 illustrates a computing device 100 configured to implement one or more aspects of various embodiments. In one embodiment, computing device 100 includes a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a scanning engine 122 that resides in a memory 116.

It is noted that the computing device described herein is illustrative and that any other technically feasible configurations fall within the scope of the present disclosure. For example, multiple instances of scanning engine 122 could execute on a set of nodes in a distributed and/or cloud computing system to implement the functionality of computing device 100. In another example, scanning engine 122 could execute on various sets of hardware, types of devices, or environments to adapt scanning engine 122 to different use cases or applications. In a third example, scanning engine 122 could execute on different computing devices and/or different sets of computing devices.

In one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and a network interface 106. Processor(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processor(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

I/O devices 108 include devices capable of providing input, such as a keyboard, a mouse, a touch-sensitive screen, a microphone, and so forth, as well as devices capable of providing output, such as a display device or speaker. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

Network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

Storage 114 includes non-volatile storage for applications and data, and may include fixed or removable disk drives, flash memory devices, and CD-ROM, DVD-ROM, Blu-Ray, HD-DVD, or other magnetic, optical, or solid-state storage devices. Scanning engine 122 may be stored in storage 114 and loaded into memory 116 when executed.

Memory 116 includes a random-access memory (RAM) module, a flash memory unit, or any other type of memory unit or combination thereof. Processor(s) 102, I/O device interface 104, and network interface 106 are configured to read data from and write data to memory 116. Memory 116 includes various software programs that can be executed by processor(s) 102 and application data associated with said software programs, including scanning engine 122.

Figure 2:
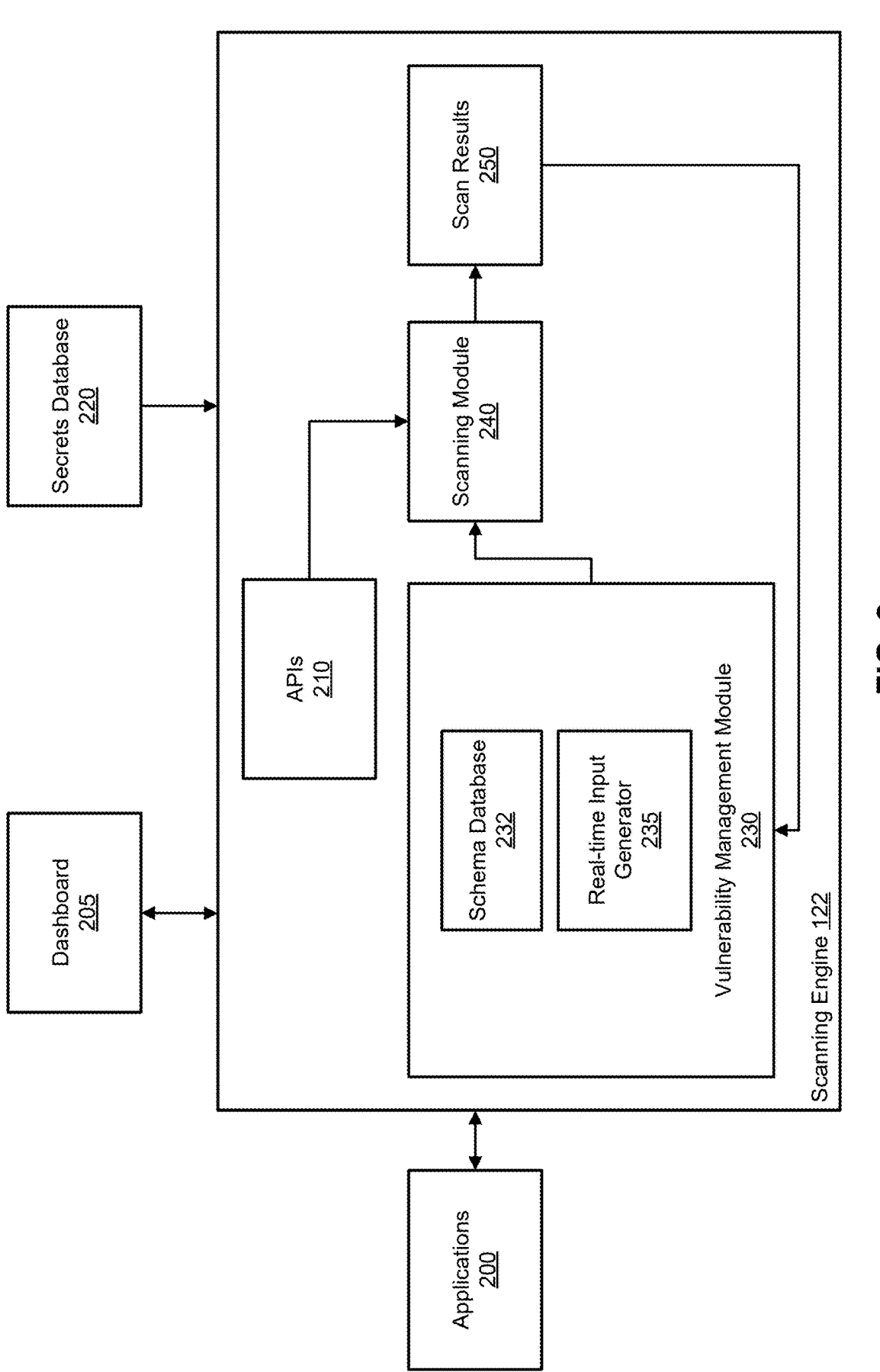
FIG. 2 is a more detailed illustration of the scanning engine of FIG. 1, according to some embodiments.

FIG. 2 is a more detailed illustration of scanning engine 122 of FIG. 1, according to some embodiments. Scanning engine 122 receives, via dashboard 205, a designation associated with a software application included in applications 200, as well as application information associated with the software application. Scanning engine 122 analyzes the software application via one or more software scanning tools and transmits status reports and/or scan results to dashboard 205. Secrets database 220 may include enterprise information, enabling scanning engine 122 to detect inadvertent or malicious embedding of enterprise information in a software application. Secrets database 220 may also include identity, authorization, and/or permissions information that enables the execution of the one or more software scanning tools. Scanning engine 122 includes, without limitation, Application Programmatic Interfaces (APIs) 210, vulnerability management module 230, schema database 232, real-time input generator 235, scanning module 240, and scan results 250.

Applications 200 include one or more software applications associated with an enterprise. Each of applications 200 may be, e.g., a locally developed software application or a third-party software application. Each of applications 200 may include open-source software, such as open-source software source code, libraries, scripts, and/or style sheets. Each of applications 200 may be stored locally in an enterprise computing system or remotely in a distributed enterprise computing system. Additionally or alternatively, each of applications 200 may be stored in a cloud storage service or a distributed network, such as the Internet.

Dashboard 205 includes an interactive textual and/or graphical user interface. Scanning engine 122 receives, via dashboard 205, user information associated with a requesting user, such as a user ID and/or a user password. Scanning engine 122 may identify and/or authenticate a requesting user based on information included in secrets database 220 described below. Scanning engine 122 may also retrieve one or more permissions and/or authentication tokens associated with the requesting user from secrets database 220. In various embodiments, scanning engine 122 may generate a unique identifier associated with the requesting user. During the application security onboarding process, scanning engine 122 may associate various generated status reports and/or scan results with the unique identifier, and transmit the status reports and/or scan results to the requesting user via dashboard 205.

A requesting user may submit, via dashboard 205, a designation associated with a software application to be onboarded, where the software application is included in applications 200. In various embodiments, the designation may be a Business Application ID (BAPPID) or other alphanumeric designation that uniquely identifies a software application.

The requesting user may submit, via dashboard 205, application information associated with the software application. The application information includes, but is not limited to, a name associated with the software application, a business unit associated with the software application, a type or category describing the software application, an Application Programmatic Interface (API) key associated with the software application, and/or a location where the software application is hosted. The requesting user may also identify one or more applicable compliance programs associated with the software application. Examples of applicable compliance programs include, but are not limited to, General Data Protection Regulation (GDPR) or Sarbanes-Oxley (SOX) compliance requirements. In various embodiments, the application information may include a designation that the software application has been designated as a high-impact or high-priority software application within an organization's enterprise computing environment.

In various embodiments, dashboard 205 may display one or more items of application information that have previously been recorded for a software application. Scanning engine 122 may retrieve the one or more items of previously recorded application information from applications 200 or from vulnerability management module 230 described below. The requesting user may correct or update previously recorded items of application information via dashboard 205.

The requesting user may also submit, via dashboard 205, user information associated with a different user and a directive that the different user is authorized to submit application information associated with the software application. In various embodiments, scanning engine 122 may transmit a message to the different user requesting that the different user submit one or more items of application information via dashboard 205. Scanning engine 122 may transmit the message via email, text message, instant message, or any other suitable messaging capability.

Secrets database 220 includes identification, authorization, and/or permissions data associated with an organization's enterprise computing environment. In various embodiments, secrets database 220 may include username and password data, user/group membership data, per-user or per-group permissions data, authentication tokens, or permissions tokens. Scanning engine 122 may retrieve identification, authorization, and/or permissions data included in secrets database as necessary to allow scanning module 240 to analyze a software application, either directly or via one or more of APIs 210 discussed below.

APIs 210 include one or more programmatic interfaces between scanning engine 122 and one or more software scanning tools included in scanning module 240. In various embodiments, APIs 210 may include multiple interfaces, where each interface is associated with one or more software scanning tools included in scanning module 240. Scanning engine 122 may, via APIs 210, access one or more software scanning tools included in scanning module 240, identify a software application included in applications 200, and direct scanning module 240 to analyze the software application via the one or more software scanning tools based on application information associated with the software application. As discussed above, scanning engine 122 may retrieve identification, authorization, and/or permissions data from secrets database 220 and transmit the identification, authorization, and/or permissions data to scanning module 240 via APIs 210.

Vulnerability management module 230 stores software application information received via dashboard 205, transmits the stored software application information to scanning module 240, and receives scan results 250 from scanning module 240. In various embodiments, one or more users may request analysis of multiple software applications via dashboard 205. Vulnerability management module 230 may prioritize the analysis of a software application based on a designation included in the application information associated with the software application indicating that the software application is a high-impact or high-priority software application within an organization's enterprise computing environment. For example, vulnerability management module 230 may prioritize the analysis of a customer-facing software application over the analysis of a software application that is internal to an organization. Vulnerability management module 230 may also prioritize the analysis of a software application based on a manual designation received via dashboard 205, or based on an indication included in the associated application information that the software application has recently been changed or updated.

In various embodiments, vulnerability management module 230 includes schema database 232. Schema database 232 may include one or more input schemas associated with one or more software scanning tools. An input schema associated with a software scanning tool may specify one or more items of input data required by the software scanning tool and a required format for each of the one or more items of input data. The input schema may also specify a required order or arrangement of the one or more items of input data. For each software scanning tool included in scanning module 240 described below, schema database 232 may include an input schema corresponding to the software scanning tool. When an organization adopts a new software scanning tool, scanning engine 122 may retrieve an input schema associated with the new software scanning tool from, e.g., a user, and store the input schema in schema database 232.

In various embodiments, vulnerability management module 230 may receive software application information from a user via dashboard 205 and store the received software application information. Vulnerability management module 230 may transmit previously stored software application information to dashboard 205 for presentation to a user via one or more pre-filled data fields, obviating the need for a user to re-enter previously stored software application data.

Vulnerability management module 230 includes real-time input generator 235. Real-time input generator 235 compares software application data received from dashboard 205 and stored in vulnerability management module 230 to one or more input schemas included in schema database 232. Based on the comparison, real-time input generator 235 transforms one or more items of software application data into a format and/or ordering specified by one of the one or more input schemas.

Real-time input generator 235 may determine whether all necessary software application data specified by an input schema is present in vulnerability management module and has been transformed as specified by the input schema. Real-time input generator 235 may evaluate the stored software application data and the one or more input schemas continuously and generate a real-time determination that all necessary software application data is available and formatted as required by an input schema. Based on the real-time determination, real-time input generator 235 generates scanning data including the stored and/or transformed software application data and transmits the scanning data to vulnerability management module 230. In various embodiments, vulnerability management module may immediately transmit the scanning data to scanning module 240 for analysis via one or more software scanning tools, as described below.

Scanning module 240 analyzes a software application included in applications 200 and detects one or more issues, such as security vulnerabilities, third-party dependency and/or licensing issues, compliance issues, or the inadvertent inclusion of secret or otherwise sensitive data. In various embodiments, scanning module 240 may include one or more software scanning tools, where each software scanning tool is operable to detect one or more of the above conditions based on software application information received from vulnerability management module 230.

Scanning module 240 may include one or more Static Application Security Testing (SAST) scanning tools. Scanning module 240 may, via a SAST scanning tool, analyze a software application without executing the software application. The SAST scanning tool may analyze computer source code, libraries, and/or compiled binary object files associated with the software application. Via the SAST scanning tool, scanning module 240 may identify one or more software vulnerabilities. Software vulnerabilities include, but are not limited to, SQL injections, cross-site scripting, Common Weakness Enumerations (CWEs), and/or Common Vulnerability Exposures (CVEs). Scanning module 240 may also identify, based on information included in secrets database 220, the inadvertent or malicious inclusion of organizational secrets, such as hardcoded or otherwise embedded usernames, passwords, authentication tokens, personally identifiable information (PII), and/or permissions tokens. The SAST scanning tool may generate a scan result including any identified security vulnerabilities and transmit the scan result to scan results 250 described below.

Scanning module 240 may include one or more Dynamic Application Security Testing (DAST) scanning tools. Scanning module 240 may, via a DAST scanning tool, execute the software application and transmit one or more predetermined inputs to the executing software application. A DAST scanning tool may compare outputs generated by the executing software application to a set of one or more expected outputs based on the predetermined inputs. The DAST scanning tool may identify one or more security vulnerabilities in the software application, generate a scan result including any identified security vulnerabilities, and transmit the scan result to scan results 250 described below.

Scanning module 240 may include one or more Software Composition Analysis (SCA) scanning tools. Scanning module 240 may, via an SCA scanning tool, identify and analyze open-source software included in or associated with a software application. In various embodiments, scanning engine 122 may retrieve, via network 110, one or more known vulnerabilities from a published vulnerability database, such as the National Vulnerability Database (NVD). Scanning engine 122 may transmit the one or more known vulnerabilities to an SCA scanning tool included in scanning module 240. The SCA scanning tool may also identify missing or expired licenses associated with open-source software code. The SCA scanning tool may identify one or more security vulnerabilities and/or license issues in the software application, generate a scan result including any identified security vulnerabilities and/or license issues, and transmit the scan result to scan results 250.

Scanning module 240 may coordinate a penetration test of a software application, where one or more computer security personnel perform an authorized, simulated cyberattack on the software application to identify security vulnerabilities in the software application. In various embodiments, scanning module 240 may automatically schedule a date and/or time for the penetration test. In other embodiments, scanning module 240 may transmit a designation associated with the software application to the one or more computer security personnel for manual inclusion in a penetration testing schedule.

Scanning module 240 may include one or more compliance scanning tools. Each of the one or more compliance scanning tools may analyze a software application for adherence to one or more published compliance standards, such as General Data Protection Regulation (GDPR) or Sarbanes-Oxley (SOX). The compliance scanning tool may identify one or more compliance standard violations in the software application, generate a scan result including the one or more compliance standard violations, and transmit the scan result to scan results 250.

Scanning module 240 may analyze a software application via simultaneous or sequential execution of multiple software scanning tools. In various embodiments, scanning module 240 may automatically execute one or more software scanning tools upon receipt of necessary software application information from vulnerability management module 230. As described above, schema database 232 includes schemas associated with each of the multiple software scanning tools, where each schema defines the software application information necessary to execute the software scanning tool. Scanning module 240 may transmit necessary software application information to a software scanning tool and commence execution of the software scanning tool upon determining, based on a schema included in schema database 232, that all necessary software application is available. Automatically executing one or more software scanning tools as soon as the necessary software application becomes available reduces delays in scanning software applications. Further, simultaneous parallel execution of multiple software scanning tools increases the efficiency and throughput of the disclosed techniques.

Scanning module 240 may generate one or more scan results 250 based on the execution of one or more software scanning tools included in scanning module 240 as described above. Each of scan results 250 may include a list of one or more security vulnerabilities and/or compliance violations in an analyzed software application. Each of scan results 250 may also include information associated with the execution of the one or more software scanning tools, such as a designation associated with an analyzed software application, a timestamp associated with the execution, a duration of the execution, and/or an identification of a user who requested the analysis of the software application. Scan results 250 may include a status report associated with one or more software scanning tools included in scanning module 240. For example, a scan result included in scan results 250 may include an indication that a specified software scanning tool is currently executing, or that the software scanning tool is awaiting necessary software application information prior to execution. Scanning engine 122 may transmit scan results 250 to vulnerability management module 230 for storage. Scanning engine 122 may also display scan results 250 to a user via dashboard 205 or transmit scan results 250 to one or more downstream software applications for further processing. In various embodiments, a user may manually initiate, via dashboard 205, retesting of one or more specified vulnerabilities via one or more specified software scanning tools. Manual retesting for specific vulnerabilities provides immediate feedback associated with troubleshooting or debugging, simplifying remediation efforts related to software vulnerabilities.

FIG. 3 is a flow diagram of method steps for performing automated software security scanning, according to some embodiments. Although the method steps are described in conjunction with the systems of FIGS. 1 and 2, persons skilled in the art will understand that any system configured to perform the method steps in any order falls within the scope of the present disclosure.

As shown, in step 302 of method 300, scanning engine 122 retrieves a software application designation and application information associated with the software application. Scanning engine 122 may retrieve the software application designation and application information from a user via dashboard 205. The software application designation may include an alphanumeric designation, such as a Business Application Identifier (BAPPID). The application information may include, but is not limited to, an application name, a business unit associated with the software application, a type or category describing the software application, an Application Programmatic Interface (API) key associated with the software application, and/or a location where the software application is hosted.

Scanning engine 122 may receive, via dashboard 205, user information associated with the user, such as a user ID and/or a user password. Scanning engine 122 may identify and/or authenticate a user based on information included in secrets database 220. Scanning engine 122 may also retrieve one or more permissions and/or authentication tokens associated with the user from secrets database 220. In various embodiments, scanning engine 122 may generate a unique identifier associated with the user.

In step 304, scanning engine 122 retrieves additional application information via vulnerability management module 230. In various embodiments, the additional application information may include previously stored application information associated with the software application, obviating the need for the user to manually enter some or all of the application information described above.

In step 306, scanning engine 122 generates scanning data based on one or more schemas included in schema database 232, a software application designation, application information, and/or additional application information. In various embodiments, scanning engine 122 may translate or transform one or more items of application information or additional application information based on a format specified in the one or more schemas. For example, scanning engine 122 may apply a standardized date format or naming convention specified by a schema to one or more items of application information. Scanning engine 122 may also re-order one or more items of application information or additional application information based on an ordering specified in the one or more schemas In step 308, scanning engine 122 transmits the generated scanning data to scanning module 240. In various embodiments, scanning engine 122 may first determine, based on one or more schemas included in schema database 232, that the application information is sufficient to execute one or more software scanning tools included in scanning module 240 prior to transmitting the generated scanning data to scanning module 240. If scanning engine 122 determines that the available application information is insufficient for execution of one or more software scanning tools, scanning engine 122 may prompt a user for additional information via dashboard 205. In various embodiments, scanning engine 122 may continuously compare the available software application information to the one or more schemas, and generate real-time determinations for each of the one or more schemas indicating whether or not the available software application information is sufficient for execution of a corresponding software scanning tool.

In step 310, scanning engine 122 analyzes the software application via one or more software scanning tools included in scanning module 240. In various embodiments, the one or more software scanning tools may include one or more of Static Application Security Testing (SAST) tools, Dynamic Application Security Testing (DAST) tools, Software Composition Analysis (SCA) scanning tools, and/or compliance analysis tools. A software scanning tool included in scanning module 240 may also coordinate a penetration test of a software application, where one or more computer security personnel perform an authorized, simulated cyberattack on the software application to identify security vulnerabilities in the software application.

In step 312, vulnerability management module 230 of scanning engine 122 receives and stores one or more scan results 250 from scanning module 230. Each of scan results 250 may include one or more identified security vulnerabilities, compliance issues, and/or open-source software issues associated with the software application. Scan results 250 may also include status reports associated with the software application and/or one or more software scanning tools, where a status report may include an indication that a software scanning tool is waiting to execute, currently executing, or has completed execution. Each of scan results 250 may also be associated with a specific user, e.g., a requesting user associated with the software application. Scan results 250 may further include statistical information associated with the execution of one or more software scanning tools, including a timestamp associated with the execution and/or a duration of the execution.

In step 314, scanning engine 122 displays the one or more scan results 250 via dashboard 205. Scanning engine 122 may display one or more scan results 250 that are associated with a particular user, software scanning tool, and/or software application. Additionally or alternatively, scanning engine 122 may transmit scan results 250 to one or more downstream software applications for further processing. A user may also select, via dashboard 205, one or more previously onboarded applications and one or more previously identified vulnerabilities associated with the applications. The user may manually initiate a re-test of the selected applications and vulnerabilities, facilitating rapid evaluation of software fixes or other corrective actions.

In sum, the disclosed techniques perform automated application security onboarding of software applications in an enterprise computing environment. In various embodiments, the automated application security onboarding may include analyzing a software application via one or more software scanning tools and detecting security vulnerabilities, third-party dependency and/or licensing issues, compliance issues, or the inadvertent inclusion of secret or otherwise sensitive data in the software application. The one or more software scanning tools may further schedule penetration testing on the software application. The disclosed techniques may sequentially or simultaneously analyze a software application via multiple software scanning tools.

In operation, a scanning engine receives, from a user via a dashboard, an application designation associated with a software application. The application designation may include a Business Application Identifier (BAPPID) associated with the software application and/or a name associated with the software application. The scanning engine may also receive application information associated with the software application via the dashboard and/or a vulnerability management module. The information associated with the software application may include, but is not limited to, a location where the software application resides or one or more permissions or authentication/authorization tokens necessary for one or more software scanning tools to analyze the software application. The information associated with the software application may also include a priority designation associated with the software application or user identification information associated with one or more users authorized to initiate an analysis of the software application.

The scanning engine may access a secrets database and/or one or more application programmatic interfaces (APIs). The secrets database may include identity, authentication and/or permission information necessary for the scanning engine to access the software applications and/or initiate scanning of the software applications via one or more software scanning tools. The secrets database may also include enterprise information, such as username and password data, user/group membership data, per-user or per-group permissions data, authentication tokens, or permissions tokens. The scanning engine may transmit enterprise information included in the secrets database to one or more software scanning tools. The APIs provide programmatic interfaces between the scanning engine and each of the multiple software scanning tools.

The scanning engine may determine, based on a schema associated with a software scanning tool, that the scanning engine has collected sufficient software application data to execute the software scanning tool. Based on the determination, the scanning engine may automatically transmit the software application data to the software scanning tool and execute the software scanning tool. The scanning engine may transmit software application data to multiple scanning tools for simultaneous execution via parallel processing, increasing both efficiency and throughput.

The software scanning tools may analyze a software application and detect one or more software vulnerabilities. Software vulnerabilities include, but are not limited to, SQL injections, cross-site scripting, Common Weakness Enumerations (CWEs), and/or Common Vulnerability Exposures (CVEs). The one or more software scanning tools may also detect inadvertent or malicious inclusion of elements included in the secrets database in a software application. The one or more software scanning tools may further schedule a penetration test to be performed on the software application. The one or more software scanning tools are operable to analyze a software application sequentially or in parallel, and each software scanning tool may immediately analyze the software application independently of the other software scanning tools upon receipt of the necessary software application information. This centralized software scanning system is operable to automatically collect necessary software application information, transmit the collected software application information to one or more software scanning tools, commence simultaneous parallel execution of multiple scanning tools, and automatically collect scan results. This automated approach reduces time and resource requirements compared to manual configuration and execution of multiple scanning tools and manual collection of scan results.

The one or more software scanning tools may transmit status reports and/or scan results to the vulnerability management module included in the scanning engine. The scanning engine may transmit the status reports and/or scan results to the dashboard for user review and/or further processing by one or more downstream software applications.

One technical advantage of the disclosed techniques relative to the prior art is that the disclosed techniques allow for efficient large-scale automated application security onboarding. The disclosed techniques may automatically process a software application via the simultaneous or sequential execution of multiple software scanning tools. Further, the disclosed techniques automatically generate real-time software scanning tool input data based on input schemas associated with the multiple software scanning tools. The techniques further allow the re-use of software application data without the need to manually re-enter the input data for each software scanning tool, improving both efficiency and accuracy relative to the prior art. These technical advantages provide one or more technological improvements over prior art approaches.

1. In some embodiments, a computer-implemented method for performing automated software security scanning comprises receiving, via an interactive dashboard, a designation associated with a software application and one or more items of application information associated with the software application, determining, in real-time and based on one or more schemas, that that the one or more items of application information are sufficient for executing one or more of a plurality of software scanning tools, transmitting the designation and the one or more items of application information to the plurality of software scanning tools, analyzing the software application via the plurality of software scanning tools, receiving, from the plurality of software scanning tools, one or more scan results based on the analysis, and displaying the one or more scan results via the interactive dashboard.

2. The computer-implemented method of clause 1, wherein a software scanning tool included in the plurality of software scanning tools includes a Static Application Security Testing (SAST) tool, a Dynamic Application Security Testing (DAST) tool, or a Software Component Analysis (SCA) tool.

3. The computer-implemented method of clauses 1 or 2, wherein a software scanning tool included in the plurality of software scanning tools automatically schedules penetration testing of the software application.

4. The computer-implemented method of any of clauses 1-3, wherein the application information includes one or more of a name associated with the software application, a business unit associated with the software application, a type or category describing the software application, an Application Programmatic Interface (API) key associated with the software application, or a location where the software application is hosted.

5. The computer-implemented method of any of clauses 1-4, further comprising receiving one or more previously stored items of application information included in a vulnerability management module.

6. The computer-implemented method of any of clauses 1-5, wherein each of the one or more scan results includes a security vulnerability or compliance issue associated with the software application.

7. The computer-implemented method of any of clauses 1-6, further comprising receiving an identifier associated with a user and one or more permissions and/or authentication tokens associated with the user.

8. The computer-implemented method of any of clauses 1-7, wherein displaying the one or more scan results is based at least on the identifier associated with the user.

9. The computer-implemented method of any of clauses 1-8, wherein a software scanning tool included in the plurality of software scanning tools detects secret or sensitive organizational information included in the software application.

10. The computer-implemented method of any of clauses 1-9, wherein analyzing the software application via the plurality of software scanning tools is performed via simultaneous execution of two or more of the plurality of software scanning tools.

11. In some embodiments, one or more non-transitory computer-readable media store instructions that, when executed by one or more processors, cause the one or more processors to perform the steps of receiving, via an interactive dashboard, a designation associated with a software application and one or more items of application information associated with the software application, determining, in real-time and based on one or more schemas, that that the one or more items of application information are sufficient for executing one or more of a plurality of software scanning tools, transmitting the designation and the one or more items of application information to the plurality of software scanning tools, analyzing the software application via the plurality of software scanning tools, receiving, from the plurality of software scanning tools, one or more scan results based on the analysis, and displaying the one or more scan results via the interactive dashboard.

12. The one or more non-transitory computer-readable media of clause 11, wherein a software scanning tool included in the plurality of software scanning tools includes a Static Application Security Testing (SAST) tool, a Dynamic Application Security Testing (DAST) tool, or a Software Component Analysis (SCA) tool.

13. The one or more non-transitory computer-readable media of clauses 11 or 12, wherein a software scanning tool included in the plurality of software scanning tools automatically schedules penetration testing of the software application.

14. The one or more non-transitory computer-readable media of any of clauses 11-13, wherein the application information includes one or more of a name associated with the software application, a business unit associated with the software application, a type or category describing the software application, an Application Programmatic Interface (API) key associated with the software application, or a location where the software application is hosted.

15. The one or more non-transitory computer-readable media of any of clauses 11-14, further comprising receiving one or more previously stored items of application information included in a vulnerability management module.

16. The one or more non-transitory computer-readable media of any of clauses 11-15, wherein each of the one or more scan results includes a security vulnerability or compliance issue associated with the software application.

17. The one or more non-transitory computer-readable media of any of clauses 11-16, further comprising receiving an identifier associated with a user and one or more permissions and/or authentication tokens associated with the user.

18. In some embodiments, a system comprises one or more memories storing instructions, and one or more processors for executing the instructions to receive, via an interactive dashboard, a designation associated with a software application and one or more items of application information associated with the software application, determine, in real-time and based on one or more schemas, that that the one or more items of application information are sufficient for executing one or more of a plurality of software scanning tools, transmit the designation and the one or more items of application information to the plurality of software scanning tools, analyze the software application via the plurality of software scanning tools, receive, from the plurality of software scanning tools, one or more scan results based on the analysis, and display the one or more scan results via the interactive dashboard.

19. The system of clause 18, wherein a software scanning tool included in the plurality of software scanning tools automatically schedules penetration testing of the software application.

20. The system of clauses 18 or 19, wherein the one or more processors further execute the instructions to receive one or more previously stored items of application information included in a vulnerability management module.

Any and all combinations of any of the claim elements recited in any of the claims and/or any elements described in this application, in any fashion, fall within the contemplated scope of the present invention and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing automated software security scanning, the method comprising:

receiving, via an interactive dashboard, a designation associated with a software application and one or more items of application information associated with the software application;

determining, in real-time and based on one or more input schemas, that the one or more items of application information are sufficient for executing one or more of a plurality of software scanning tools, wherein the one or more input schemas are stored in a schema database and each of the one or more input schemas specifies (a) a first set of one or more items of application information required by a software scanning tool included in the plurality of software tools and (b) a required format associated with each of one or more of the items of application information included in the first set of one or more items of application information;

transmitting the designation and the one or more items of application information to the plurality of software scanning tools;

analyzing the software application via the plurality of software scanning tools;

receiving, from the plurality of software scanning tools, one or more scan results based on the analysis; and displaying the one or more scan results via the interactive dashboard.

2. The computer-implemented method of claim 1, wherein a software scanning tool included in the plurality of software scanning tools includes a Static Application Security Testing (SAST) tool, a Dynamic Application Security Testing (DAST) tool, or a Software Component Analysis (SCA) tool.

3. The computer-implemented method of claim 1, wherein a software scanning tool included in the plurality of software scanning tools automatically schedules penetration testing of the software application.

4. The computer-implemented method of claim 1, wherein the application information includes one or more of a name associated with the software application, a business unit associated with the software application, a type or category describing the software application, an Application Programmatic Interface (API) key associated with the software application, or a location where the software application is hosted.

5. The computer-implemented method of claim 1, further comprising receiving one or more previously stored items of application information included in a vulnerability management module.

6. The computer-implemented method of claim 1, wherein each of the one or more scan results includes a security vulnerability or compliance issue associated with the software application.

7. The computer-implemented method of claim 1, further comprising receiving (a) an identifier associated with a user and (b) one or more of permissions or authentication tokens associated with the user.

8. The computer-implemented method of claim 7, wherein displaying the one or more scan results is based at least on the identifier associated with the user.

9. The computer-implemented method of claim 1, wherein a software scanning tool included in the plurality of software scanning tools detects secret or sensitive organizational information included in the software application.

10. The computer-implemented method of claim 1, wherein analyzing the software application via the plurality of software scanning tools is performed via simultaneous execution of two or more of the plurality of software scanning tools.

11. One or more non-transitory computer-readable media storing instructions that, when executed by one or more processors, cause the one or more processors to perform the steps of:

receiving, via an interactive dashboard, a designation associated with a software application and one or more items of application information associated with the software application;

determining, in real-time and based on one or more input schemas, that the one or more items of application information are sufficient for executing one or more of a plurality of software scanning tools, wherein the one or more input schemas are stored in a schema database and each of the one or more input schemas specifies (a) a first set of one or more items of application information required by a software scanning tool included in the plurality of software tools and (b) a required format associated with each of one or more of the items of application information included in the first set of one or more items of application information;

transmitting the designation and the one or more items of application information to the plurality of software scanning tools;

analyzing the software application via the plurality of software scanning tools;

receiving, from the plurality of software scanning tools, one or more scan results based on the analysis; and displaying the one or more scan results via the interactive dashboard.

12. The one or more non-transitory computer-readable media of claim 11, wherein a software scanning tool included in the plurality of software scanning tools includes a Static Application Security Testing (SAST) tool, a Dynamic Application Security Testing (DAST) tool, or a Software Component Analysis (SCA) tool.

13. The one or more non-transitory computer-readable media of claim 11, wherein a software scanning tool included in the plurality of software scanning tools automatically schedules penetration testing of the software application.

14. The one or more non-transitory computer-readable media of claim 11, wherein the application information includes one or more of a name associated with the software application, a business unit associated with the software application, a type or category describing the software application, an Application Programmatic Interface (API) key associated with the software application, or a location where the software application is hosted.

15. The one or more non-transitory computer-readable media of claim 11, further comprising receiving one or more previously stored items of application information included in a vulnerability management module.

16. The one or more non-transitory computer-readable media of claim 11, wherein each of the one or more scan results includes a security vulnerability or compliance issue associated with the software application.

17. The one or more non-transitory computer-readable media of claim 11, further comprising receiving (a) an identifier associated with a user and (b) one or more of permissions or authentication tokens associated with the user.

18. A system comprising:

one or more memories storing instructions; and one or more processors for executing the instructions to:

receive, via an interactive dashboard, a designation associated with a software application and one or more items of application information associated with the software application;

determine, in real-time and based on one or more input schemas, that the one or more items of application information are sufficient for executing one or more of a plurality of software scanning tools, wherein the one or more input schemas are stored in a schema database and each of the one or more input schemas specifies (a)

a first set of one or more items of application information required by a software scanning tool included in the plurality of software tools and (b) a required format associated with each of one or more of the items of application information included in the first set of one or more items of application information;

transmit the designation and the one or more items of application information to the plurality of software scanning tools;

analyze the software application via the plurality of software scanning tools;

receive, from the plurality of software scanning tools, one or more scan results based on the analysis; and display the one or more scan results via the interactive dashboard.

19. The system of claim 18, wherein a software scanning tool included in the plurality of software scanning tools automatically schedules penetration testing of the software application.

20. The system of claim 18, wherein the one or more processors further execute the instructions to receive one or more previously stored items of application information included in a vulnerability management module.

* * * * *